(12) United States Patent
Blattner et al.

(10) Patent No.: US 11,777,291 B2
(45) Date of Patent: Oct. 3, 2023

(54) SANITARY WALL INSTALLATION CONNECTION BOX UNIT HAVING AN ELECTRIC LINE FEED-THROUGH

(71) Applicant: Hansgrohe SE, Schiltach (DE)

(72) Inventors: Joachim Blattner, Haslach (DE); Jürgen Schorer, Schiltach (DE); Günther Lehmann, Oberwolfach (DE); Thomas Doll, Oberkirch (DE); Philip Stephan, Rheinau (DE); Christoph Heizmann, Wolfach (DE); Marika Krämer, Hofstetten (DE)

(73) Assignee: Hansgrohe SE, Schiltach (DE)

( * ) Notice: Subject to any disclaimer, the term of this patent is extended or adjusted under 35 U.S.C. 154(b) by 0 days.

(21) Appl. No.: 17/209,937

(22) Filed: Mar. 23, 2021

(65) Prior Publication Data
US 2021/0305796 A1    Sep. 30, 2021

(30) Foreign Application Priority Data

Mar. 24, 2020  (DE) .................. 10 2020 203 800.7

(51) Int. Cl.
*H02G 3/08* (2006.01)
*F16L 5/14* (2006.01)
*H02G 3/22* (2006.01)

(52) U.S. Cl.
CPC ............... *H02G 3/088* (2013.01); *F16L 5/14* (2013.01); *H02G 3/081* (2013.01); *H02G 3/22* (2013.01)

(58) Field of Classification Search
CPC ...... H02G 3/0691; H02G 3/081; H02G 3/085; H02G 3/22; H02G 3/088; F16L 5/14; E03C 1/021
See application file for complete search history.

(56) References Cited

U.S. PATENT DOCUMENTS 1,822,056 A * 9/1931 Noble .................... H02G 3/065
                                                        285/179
2,297,862 A   10/1942 Bachmann
(Continued)

FOREIGN PATENT DOCUMENTS

| AT | 507052 | | 1/2010 |
|---|---|---|---|
| AT | 517356 | | 1/2017 |
| CH | 681237 | A5 | 2/1993 |
| CN | 204732809 | | 10/2010 |
| CN | 102057205 | A | 5/2011 |
| CN | 203589341 | U | 5/2014 |

(Continued)

OTHER PUBLICATIONS

European Search Report (in German language) issued by the European Patent Office, dated Aug. 19, 2021, for European Patent Application No. 21164307.7, 9 pages.

(Continued)

*Primary Examiner* — William H. Mayo, III
*Assistant Examiner* — Rhadames Alonzo Miller
(74) *Attorney, Agent, or Firm* — Bose McKinney & Evans LLP

(57) ABSTRACT

A sanitary wall installation connection box unit, including a box housing body having a rear-side base portion and a sleeve portion projecting to the front from the base portion, which sleeve portion peripherally surrounds a sanitary component mounting space, which space is accessible via an open front end face of the sleeve portion, and a connector body disposed on the base portion of the box housing body, which connector body includes a sanitary component connection contour facing the sanitary component mounting space, a fluid line connection interface structure accessible on an outer side of the box housing body, a fluid conduit structure for fluid connection of the fluid line connection interface structure to the sanitary component connection contour and at least one electric line feed-through opening leading from an outer side of the connector body through the connector body to the sanitary component mounting space.

(Continued)

Illustratively, the base portion of the box housing body is made of a sealing resilient material at least in an electric line connection region adjacent to the electric line feed-through opening of the connector body, and the electric line feed-through opening of the connector body is covered on an outer side by a closure membrane made of the sealing resilient material of the electric line connection region of the base portion.

14 Claims, 2 Drawing Sheets

(56) References Cited

U.S. PATENT DOCUMENTS

| | | | | |
|---|---|---|---|---|
| 4,181,329 | A | * | 1/1980 | Helm .................... F16L 37/091 285/305 |
| 4,265,265 | A | * | 5/1981 | Wallace ................. F01D 15/062 418/41 |
| 4,265,365 | A | * | 5/1981 | Boteler .................. H02G 3/088 174/53 |
| 5,046,521 | A | | 9/1991 | Jensen |
| 5,368,065 | A | | 11/1994 | Humpert |
| 5,783,774 | A | | 7/1998 | Bowman et al. |
| 5,913,439 | A | | 6/1999 | Von Arx |
| 5,934,032 | A | | 8/1999 | Oberdorfer |
| 6,499,771 | B1 | * | 12/2002 | Snyder, Sr. ......... F16L 37/0915 285/319 |
| 6,547,285 | B1 | * | 4/2003 | Schoenweger ......... E03C 1/021 285/119 |
| 6,992,252 | B1 | * | 1/2006 | Rao ........................ H02G 3/083 174/64 |
| 7,462,775 | B1 | | 12/2008 | Gretz |
| 7,523,837 | B2 | * | 4/2009 | Schoenweger ........ H02G 3/121 220/3.7 |
| 8,158,884 | B2 | * | 4/2012 | de la Borbolla ....... H02G 3/088 174/54 |
| 8,398,122 | B2 | * | 3/2013 | Crompton ............ F16L 37/091 29/521 |
| 8,459,301 | B2 | | 6/2013 | Lorch |
| 8,899,431 | B1 | | 12/2014 | Shotey et al. |
| 9,086,179 | B1 | * | 7/2015 | Komolrochanaporn ..................... F16L 37/091 |
| 10,280,598 | B2 | | 5/2019 | Tzeng |
| 10,745,894 | B2 | * | 8/2020 | Colombo ................ E03C 1/021 |
| 10,889,968 | B2 | * | 1/2021 | Philipps .................. E03C 1/021 |
| 11,451,029 | B2 | | 9/2022 | Tseng et al. |
| 2004/0050423 | A1 | | 3/2004 | Schoenweger |
| 2005/0194785 | A1 | * | 9/2005 | Shemtov ............. F16L 19/0212 285/382.7 |
| 2011/0101673 | A1 | | 5/2011 | Kern-Emmerich et al. |
| 2011/0309611 | A1 | * | 12/2011 | Smith .................... H02G 3/065 285/139.3 |
| 2012/0284994 | A1 | * | 11/2012 | Crompton ........... F16L 37/0915 285/308 |
| 2013/0334220 | A1 | | 12/2013 | Sohler |
| 2015/0259891 | A1 | * | 9/2015 | Ismert ..................... E03C 1/12 137/360 |
| 2016/0352087 | A1 | | 12/2016 | Wurms |
| 2017/0002551 | A1 | | 1/2017 | Zhou |
| 2017/0152979 | A1 | | 6/2017 | Klein et al. |
| 2017/0152980 | A1 | | 6/2017 | Klein et al. |
| 2017/0256930 | A1 | * | 9/2017 | Wurms .................. H02G 3/081 |
| 2018/0003329 | A1 | | 1/2018 | Sochtig et al. |
| 2018/0017197 | A1 | | 1/2018 | Meister et al. |
| 2018/0073223 | A1 | | 3/2018 | Colombo |
| 2018/0123332 | A1 | | 5/2018 | Laukhuf |
| 2018/0266606 | A1 | | 9/2018 | Meister et al. |
| 2018/0274705 | A1 | | 9/2018 | Meister et al. |
| 2019/0107234 | A1 | | 4/2019 | Corbett et al. |
| 2019/0134524 | A1 | | 5/2019 | De Wilde |
| 2019/0219170 | A1 | | 7/2019 | Gandolfo et al. |
| 2019/0338498 | A1 | * | 11/2019 | Luig ....................... E03C 1/021 |
| 2019/0338499 | A1 | | 11/2019 | Philipps et al. |
| 2021/0301507 | A1 | * | 9/2021 | Lehmann ............. H02G 3/0616 |
| 2021/0301508 | A1 | * | 9/2021 | Grob ........................ E03C 1/021 |
| 2021/0305793 | A1 | * | 9/2021 | Lehmann ................ E03C 1/021 |

FOREIGN PATENT DOCUMENTS

| | | |
|---|---|---|
| CN | 106195376 A | 12/2016 |
| CN | 106461141 A | 2/2017 |
| CN | 107620846 A | 1/2018 |
| CN | 108290079 A | 7/2018 |
| CN | 108626505 A | 10/2018 |
| CN | 208461082 U | 2/2019 |
| CN | 109630785 A | 4/2019 |
| CN | 209388954 U | 9/2019 |
| CN | 110557957 A | 12/2019 |
| CN | 114498493 A | 5/2022 |
| DE | 2637719 | 2/1978 |
| DE | 3310138 A1 | 10/1984 |
| DE | 3907588 A1 | 9/1990 |
| DE | 4417485 C2 | 8/1997 |
| DE | 19715651 | 10/1998 |
| DE | 19856156 A1 | 6/2000 |
| DE | 20105345 | 7/2001 |
| DE | 10036996 | 1/2002 |
| DE | 10122022 A1 | 11/2002 |
| DE | 10233858 A1 | 1/2004 |
| DE | 102004060744 | 6/2006 |
| DE | 20321431 | 4/2007 |
| DE | 102007002235 A1 | 7/2008 |
| DE | 102007044284 A1 | 3/2009 |
| DE | 102008064253 B3 | 2/2010 |
| DE | 202009014967 | 2/2010 |
| DE | 102009012838 B3 | 8/2010 |
| DE | 102009049711 | 4/2011 |
| DE | 102012203393 | 9/2013 |
| DE | 202014106179 U1 | 3/2015 |
| DE | 102015112420 A1 | 2/2017 |
| DE | 102014208291 B4 | 2/2018 |
| DE | 102017100707 | 7/2018 |
| DE | 102017100710 | 7/2018 |
| DE | 102017127151 A1 | 5/2019 |
| EP | 424690 | 5/1991 |
| EP | 0546288 A1 | 6/1993 |
| EP | 1006244 | 6/2000 |
| EP | 1256662 | 11/2002 |
| EP | 1355399 A1 | 10/2003 |
| EP | 1382757 A1 | 1/2004 |
| EP | 1382757 B1 | 8/2007 |
| EP | 2101002 | 9/2009 |
| EP | 2226432 A2 | 9/2010 |
| EP | 2636803 A2 | 9/2013 |
| EP | 2468966 B1 | 10/2013 |
| EP | 2822121 | 1/2015 |
| EP | 2636803 B1 | 10/2017 |
| EP | 3486380 A1 * | 5/2019 |
| EP | 3486380 A1 | 5/2019 |
| EP | 3570396 | 11/2019 |
| GB | 622374 A | 5/1949 |
| GB | 2337287 A | 11/1999 |
| JP | 2002374613 A | 12/2002 |
| NO | 336337 B1 | 8/2015 |
| PL | 183459 B1 | 5/1998 |
| RU | 2518469 C2 | 6/2014 |
| WO | 03081054 A1 | 10/2003 |
| WO | 2010069606 | 6/2010 |
| WO | WO-2015166084 A1 * | 11/2015 ............ H02G 3/085 |
| WO | 2016147042 | 9/2016 |
| WO | 2017091839 | 6/2017 |

OTHER PUBLICATIONS

Office Action in German Language issued by the German Patent Office, Munich, dated Feb. 22, 2021, for German Patent Application No. 102020203800.7, 6 pages.

Decision on Granting issued by the Patent Office in the Russian Federation dated Nov. 24, 2021 (including English language translation), 19 pages.

(56) References Cited

OTHER PUBLICATIONS

Office Action issued by the National Intellectual Property Administration, P.R. China, dated Jul. 25, 2022 for Chinese Patent Application No. 202110312452.3 (Chinese and English Language), 6 pages and 5 pages, respectively.

Office Action issued by the National Intellectual Property Administration, P.R. China, dated Jul. 25, 2022 for Chinese Patent Application No. 202110312440.0 (Chinese Language), 8 pages.

Office Action issued by the National Intellectual Property Administration, P.R. China, dated Aug. 8, 2022 for Chinese Patent Application No. 202110312348.4 (Chinese and English Language), 14 pages.

Translation of Chinese Office Action from the National Intellectual Property Administration, 4 pages.

Translation of Chinese Search Report from the National Intellectual Property Administration, 3 pages.

* cited by examiner

SANITARY WALL INSTALLATION CONNECTION BOX UNIT HAVING AN ELECTRIC LINE FEED-THROUGH

CROSS-REFERENCE TO RELATED APPLICATION

This application claims priority to German Patent Application No. DE 10 2020 203 800.7, filed on Mar. 24, 2020, the disclosure of which is expressly incorporated herein by reference.

BACKGROUND AND SUMMARY OF THE DISCLOSURE

The invention relates to a sanitary wall installation connection box unit which includes a box housing body having a rear-side base portion and a sleeve portion projecting forward from the base portion, and a connector body disposed on the base portion of the box housing body. The sleeve portion peripherally surrounds a sanitary component mounting space, which space is accessible via an open front end face of the sleeve portion. The connector body includes a sanitary component connection contour facing the sanitary component mounting space, a fluid line connection interface structure accessible on an outer side of the box housing body, a fluid conduit structure for fluid connection of the fluid line connection interface structure to the sanitary component connection contour, and at least one electric line feed-through opening leading from an outer side of the connector body through the connector body to the sanitary component mounting space.

Such and similar connection box units are typically used for connecting sanitary components, such as water outlet fittings for washbasins, bathtubs, showers or kitchen sinks, or sanitary thermostatic, mixer and/or shut-off valve units mounted upstream of such fittings, to water conduit connections pre-installed in the building. Typical in this context are especially flush-mounted designs in which the wall installation connection box unit is installed in the relevant building wall in such a manner that it ends on the front side in as flush a manner as possible with the finished building wall surface, for example a plastered wall surface or a tiled wall surface. It is understood that the building wall in this case can be either a vertical building wall in the narrower sense or a bottom wall or bottom surface or a top wall or top surface of a building or of a room, for example of a shower room, a bathroom, a toilet room, a kitchen, etc.

The fluid line connection interface structure typically includes one or more connection interfaces, in particular in the form of corresponding pipe conduit connection ports, for coupling to a corresponding pipe conduit connection port in the building, for example for cold water, hot water or mixed water mixed from cold water and hot water. The sanitary component connection contour of the connector body is configured to cooperate with a corresponding connection contour of a sanitary component to be coupled thereto, such as a mixing and/or shut-off valve unit or a water outlet fitting. The fluid conduit structure ensures the required fluid connection between the fluid line connection interface structure on the outer side of the box and the sanitary component connection contour on the inner side of the box and, for this purpose, accordingly has one or more fluid conduits which connect the respective outer side connection interface to the sanitary component connection contour in the sanitary component mounting space.

The connection box unit is inserted with its rear side or a rear-side bottom in front into a building wall opening or placed on a building wall, for example on a wall produced in a dry construction, wherein the required fluid connections between the connections in the building and the connection interface structure of the connector body are produced. After completion of the wall, an associated sanitary component can then be introduced into the mounting space of the box housing body via the open front end face of the box housing body and coupled to the matching connection contour of the connector body.

The electric line feed-through opening serves to guide an electric connection line from the outside through the connector body for electric connection of an installation component which is introduced into the sanitary component mounting space and has electrical functionality. The installation component can be in particular a sanitary component with an additional electrical function, for example a sanitary valve with electrical actuation or the like, or an electric component without a fluid-guiding function, for example an electric sensor for measuring temperature or flow, etc. The electric line can be, for example, an electric supply line, via which the relevant sanitary component is supplied with electrical energy, and/or can be an electric signal connection, via which, for example, sensor signals, control signals, etc. are transmitted. The term electric line should be understood here in the general sense of meaning any wire-bound electric connection, which includes in particular any conventional line arrangements in the form of one or more electric cables and/or uncoated electric lines.

Electric line feed-throughs through housing walls of a box housing body of a sanitary wall installation connection box unit are known in various forms, with a fluid-tight design frequently being desired. For this purpose, use is conventionally made of, for example, fluid-tight connection sleeves, see laid-open publication DE 10 2007 002 235 A1. Patent publication DE 10 2009 012 838 B3 discloses the measure to design an electric cable feed-through between a main housing part and a secondary housing part water-tight, wherein a sanitary fitting component is accommodated in the main housing part, which is not completely water-tight, and an electrical voltage supply is accommodated in the secondary housing part, which is water-tight.

Laid-open publication DE 10 2017 127 151 A1 discloses a sanitary wall installation connection box unit of the type mentioned at the outset. Known cable feed-throughs through a housing wall of the box housing body are referred to there as being disadvantageous because of the lack of liquid tightness of the box housing body in relation to the external surroundings or because of the outlay on water-tight screwing of an electric cable onto the housing wall, and, as a remedy, it is proposed to use one of the fluid conduits of the fluid conduit structure, in a departure from its original purpose, not as a fluid-guiding conduit between the fluid line connection interface structure on the outer side of the box housing body and the sanitary component connection contour in the sanitary component mounting space, but rather as an electric line feed-through opening. An additional seal specially designed therefor surrounds the fed-through cable and is intended to seal the fluid conduit. In this embodiment, at least one fluid conduit of the fluid conduit structure is consequently no longer available for guiding fluid.

It is an object of the invention to provide a sanitary wall installation connection box unit of the type mentioned at the outset which in particular provides functional advantages and/or advantages in respect of the electric line feed-through and/or in respect of the outlay on manufacturing and/or installation in comparison to the above-mentioned prior art.

The invention achieves this and other objects by providing a sanitary wall installation connection box unit which includes a box housing body having a rear-side base portion and a sleeve portion projecting forward from the base portion, and a connector body disposed on the base portion of the box housing body. The sleeve portion peripherally surrounds a sanitary component mounting space, which space is accessible via an open front end face of the sleeve portion. The connector body includes a sanitary component connection contour facing the sanitary component mounting space, a fluid line connection interface structure accessible on an outer side of the box housing body, a fluid conduit structure for fluid connection of the fluid line connection interface structure to the sanitary component connection contour, and at least one electric line feed-through opening leading from an outer side of the connector body through the connector body to the sanitary component mounting space.

The base portion of the box housing body is made of a sealing resilient material at least in an electric line connection region adjacent to the electric line feed-through opening of the connector body, and the electric line feed-through opening of the connector body is covered on an outer side by a closure membrane made of the sealing resilient material of the electric line feed-through region of the base portion.

This measure advantageously combines the provision of a preferably fluid-tight electric line feed-through with a manufacturing, which is favorable functionally and in respect of the outlay on manufacturing/installation, of the base portion of the box housing body from sealing resilient material at least in the electric line connection region thereof adjacent to the electric line feed-through opening of the connector body. The fluid line connection interface structure can be kept free from the electric line feed-through. The sealing resilient material of the base portion, in the electric line connection region thereof and possibly also in other regions of the base portion, if the base portion is also formed there or as a whole from the sealing resilient material, can be used, depending on requirements, for further intended uses. The closure membrane made of the sealing resilient material reliably covers the electric line feed-through opening of the connector body. In order to introduce an electric line into the electric line feed-through opening of the connector body, the sealing resilient material of the closure membrane can be suitably broken through with little outlay, with the closure membrane furthermore being able to continue to carry out its covering and closure function.

Advantageous developments of the invention are specified in the dependent claims, the wording of which is hereby made part of the description by reference. This in particular also includes all of the embodiments of the invention that arise from the combinations of features which are defined by the dependency references in the dependent claims.

In a development of the invention, the connection box unit includes an electric line which is fed through a membrane aperture formed in the closure membrane, wherein the sealing resilient material of the closure membrane rests sealingly on the edge of the membrane aperture pressing radially inwards against the electric line. Reliable fluid-tight sealing for the fed-through electric line can thereby be obtained with comparatively little outlay without a separate seal being required specifically for this purpose. In alternative embodiments, such a separate seal can be used or the feed-through of the electric line can be formed without being fluid-tight.

In a development of the invention, the connector body has an annular or cylindrical shape and the electric line feed-through opening extends peripherally through the connector body in radial direction or with a radial main direction component. This is a configuration of the connector body and supply option for an electric line that is favorable for many applications. A main direction component means here, as customary, that a longitudinal axis of the line feed-through opening extends with a greater radial direction component and, by contrast, smaller direction component perpendicular thereto, i.e. in the circumferential/axial direction. The annular/cylindrical shape of the connector body can generally be of any cross section, in particular circular, oval or polygonal. It can be an annular/cylindrical shape that is closed or open peripherally. In alternative embodiments, the connector body has a different shape, and/or the electric line feed-through opening extends with an axial and/or peripheral main direction component through the connector body.

In a refinement of the invention, the fluid line connection interface structure includes a plurality of fluid line connection interfaces disposed on a peripheral side of the connector body, and the fluid conduit structure includes a plurality of associated fluid conduits between the respective fluid line connection interface and the sanitary component connection contour. The electric line feed-through opening is disposed peripherally between two of the fluid conduit structures, or the connector body includes a plurality of electric line feed-through openings, with at least one of said openings being disposed between two of the fluid conduit structures.

In an advantageous configuration which also permits a relatively compact constructional form for the connector body, the connector body thus provides the respectively required fluid line connections and fluid feed-throughs and the one or more required electric line feed-throughs. The line feed-throughs can be arranged, for example, in a manner alternating in the peripheral direction with the fluid feed-throughs, i.e. with the fluid conduits; alternatively, the fluid conduits and the electric line feed-throughs can be arranged in a different sequence in the peripheral direction, for example only the fluid conduits on one half of the periphery and only the one or more electric line feed-throughs on the other half of the periphery.

In one development of the invention, the base portion of the box housing body in the electric line connection region has an outside, blind hole-shaped tube insertion port opening in the sealing resilient material, wherein the tube insertion port opening in longitudinal direction overlaps with the electric line feed-through opening of the connector body, and the closure membrane forms a bottom region of the tube insertion port opening.

With little outlay, this creates the possibility of being able to insert a tube into the sealing resilient material in the electric line connection region of the base portion of the box housing body from the outside and of being able to retain said tube on said material. Depending on requirements, such a tube can be used for different purposes, for example for guiding an electric line and/or a fluid and/or a light signal line or some other light line. If there is a plurality of electric line feed-through openings, such a tube insertion port opening can in each case be assigned to only one of them or to a plurality of them and even to all of them. In alternative embodiments, no such tube insertion port opening is formed on the base portion of the box housing body.

In a refinement of the invention, the tube insertion port opening is coaxial, i.e. has coinciding longitudinal axes, to the electric line feed-through opening of the connector body.

This is an optimum orientation of the tube insertion port opening for many applications, with the tube insertion port opening, depending on requirements, being able to have an opening diameter which is larger or smaller than, or identically sized to, the associated electric line feed-through opening of the connector body. In alternative embodiments, the tube insertion port opening is arranged, for example, with the longitudinal axis oriented obliquely with respect to the longitudinal axis of the associated line feed-through opening.

In a refinement of the invention, the connection box unit includes a tube retaining ridge structure made of the sealing resilient material and formed on a peripheral edge of the tube insertion port opening to project radially inwards. The tube retaining ridge structure can advantageously contribute to retaining a tube inserted into the tube insertion port opening to secure it against it unintentionally coming out. For this purpose, the sealing resilient material of the tube retaining ridge structure can press radially against the inserted tube and can secure it, for example by means of frictional engagement, against moving axially. The tube retaining ridge structure can include, for example, one or more axially spaced-apart retaining ridges extending peripherally continuously or in interrupted form. Alternatively, the tube is kept inserted without such a ridge structure, or other conventional tube retaining means are provided, for example by using a screw connection, a pipe clip or the like.

In a refinement of the invention, the connection box unit includes a line receiving tube which is provided for receiving an electric line and is inserted with a box-side tube end into the tube insertion port opening. This is an embodiment of the tube inserted into the tube insertion port opening that is advantageous for the feeding-through of the electric line. The line receiving tube can be in particular an empty tube which is customary in electric installation technology and is conceived for feeding-through electric cables or other electric lines. In alternative embodiments, a tube used only for fluid-guiding purposes can be inserted into the tube insertion port opening in order not only to use the electric line feed-through opening for feeding-through an electric line, but additionally for feeding-through a fluid, wherein the electric line in this case is supplied next to or outside the tube of the electric line feed-through opening of the connector body.

In a development of the invention, the connector body is composed of a synthetic or metallic material which has greater stiffness as compared to the sealing resilient material of the electric line feed-through region of the base portion. This selection of material is advantageous in practice for many applications. For example, as in many conventional applications, the connector body can be composed of brass or of another metallic material used in sanitary technology.

In a development of the invention, the sealing resilient material of the electric line feed-through region of the base portion is a synthetic foamed material, which can be in particular a thermoplastic particle foamed material, alternatively another conventional synthetic foamed material. This is an advantageous selection of material from manufacturing and installation aspects and also in respect of the functional properties required for the electric line feed-through region of the base portion of the box housing body. For example, the material can be a polypropylene foamed material, but also a foamed material made of another plastic which has the required function of sealing resilience. In alternative embodiments, the sealing resilient material is not a foamed material but rather, for example, a rubber material.

In a development of the invention, the base portion in total is made of the synthetic foamed material, and the connector body is embedded in the synthetic foamed material of the base portion. This is an embodiment of the base portion of the box housing body and integration of the connector body into the base portion that is advantageous for many applications. The embedding of the connector body into the synthetic foamed material of the base portion retains the connector body integrally and securely in the base portion and is a connection of the connector body to the base portion that is favorable in terms of manufacturing and installation.

The connection box unit according to the invention is appropriate as a method aspect of the invention for use for a corresponding installation method. According to this method, first of all the connection box unit is attached at the installation site, i.e. is mounted on the relevant building wall or is installed in the latter, including to make the desired fluid connections, and the relevant sanitary component is introduced into the mounting space, unless already preassembled there. The closure membrane is subsequently opened, for example by means of piercing with a piercing tool. The electric line is then fed through the closure membrane and the line feed-through opening of the connector body. Here, the associated line receiving tube, if provided, is also inserted into the tube insertion port opening of the base portion of the box housing body, wherein the line can be fed through the tube and/or through the closure membrane and the line feed-through opening before or after the tube is inserted into the tube insertion port opening, depending on the application.

Additional features and advantages of the present invention will become apparent to those skilled in the art upon consideration of the following detailed description of the illustrative embodiments best exemplifying the best mode of carrying out the invention as presently perceived.

BRIEF DESCRIPTION OF THE DRAWINGS

Advantageous exemplary embodiments of the invention are illustrated in the drawings. These and further illustrative embodiments of the invention will be described in more detail below. In the drawings.

DETAILED DESCRIPTION OF THE DRAWINGS

Figure 1:
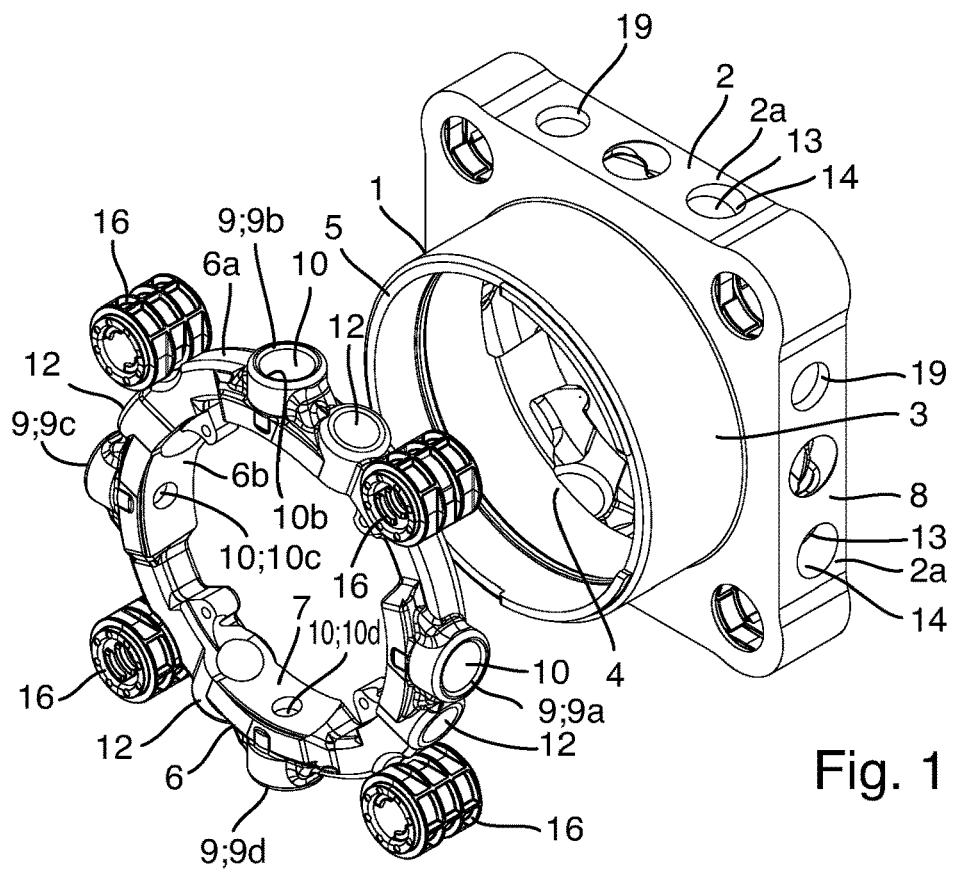
FIG. 1 shows a perspective exploded view of illustrative parts of an exemplary embodiment of a sanitary wall installation connection box unit having a box housing body and a connector body.

The embodiments of the invention described herein are not intended to be exhaustive or to limit the invention to precise forms disclosed. Rather, the embodiments selected for description have been chosen to enable one skilled in the art to practice the invention.

The sanitary wall installation connection box unit illustrated in the figures with reference to exemplary embodiments includes a box housing body 1 having a rear-side base portion 2 and a sleeve portion 3 projecting forward from the base portion 2, and a connector body 6 disposed on the base portion 2 of the box housing body 1. The sleeve portion 3 peripherally surrounds a sanitary component mounting space 4, which space is accessible via an open front end face 5 of the sleeve portion 3. The connector body 6 includes a sanitary component connection contour 7 facing the sanitary component mounting space 4, a fluid line connection interface structure 9 accessible on an outer side 8 of the box housing body 1, and a fluid conduit structure 10. The fluid conduit structure 10 ensures the required fluid connection of the fluid line connection interface structure 9 to the sanitary component connection contour 7.

Furthermore, the connector body 6 includes at least one electric line feed-through opening 12 leading from an outer side 6a of the connector body 6 through the connector body 6 to the sanitary component mounting space 4 on an inner side 6b of the connector body 6, on which side the fluid line connection interface structure 9 is also located. The base portion 2 of the box housing body 1 is made of a sealing resilient material at least in an electric line connection region 2a adjacent to the electric line feed-through opening 12 of the connector body 6. The electric line feed-through opening 12 of the connector body 6 is covered on an outer side by a closure membrane 13 made of the sealing resilient material of the electric line feed-through region 2a of the base portion 2, as can be seen in particular from FIGS. 2 to 4.

In the example shown, there are four line feed-through openings 12 which each extend from the outer side 6a of the connector body 6 to the inner side 6b thereof. The respective line feed-through opening 12 can be used, for example, for the feeding-through of an electric line cable or of another electric line or of another elongate element, for which purpose the closure membrane 13 is then suitably opened. If the line feed-through opening 12 in the connector body 6 is not required for this purpose, it remains unoccupied and covered by the closure membrane 13.

Figure 3:
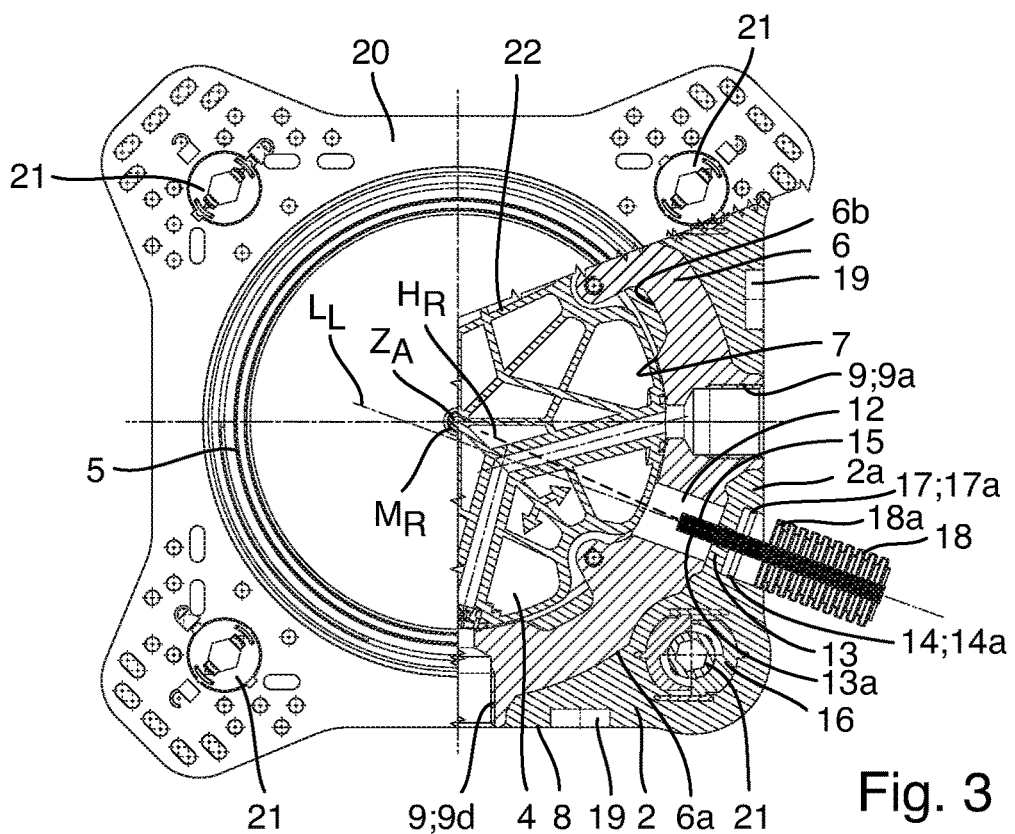
FIG. 3 shows a top view from the front of a second variant embodiment of the connection box unit of FIG. 1 in a partially broken-away illustration to show an electric line in a line guide with an empty tube in a non-inserted position.
Figure 4:
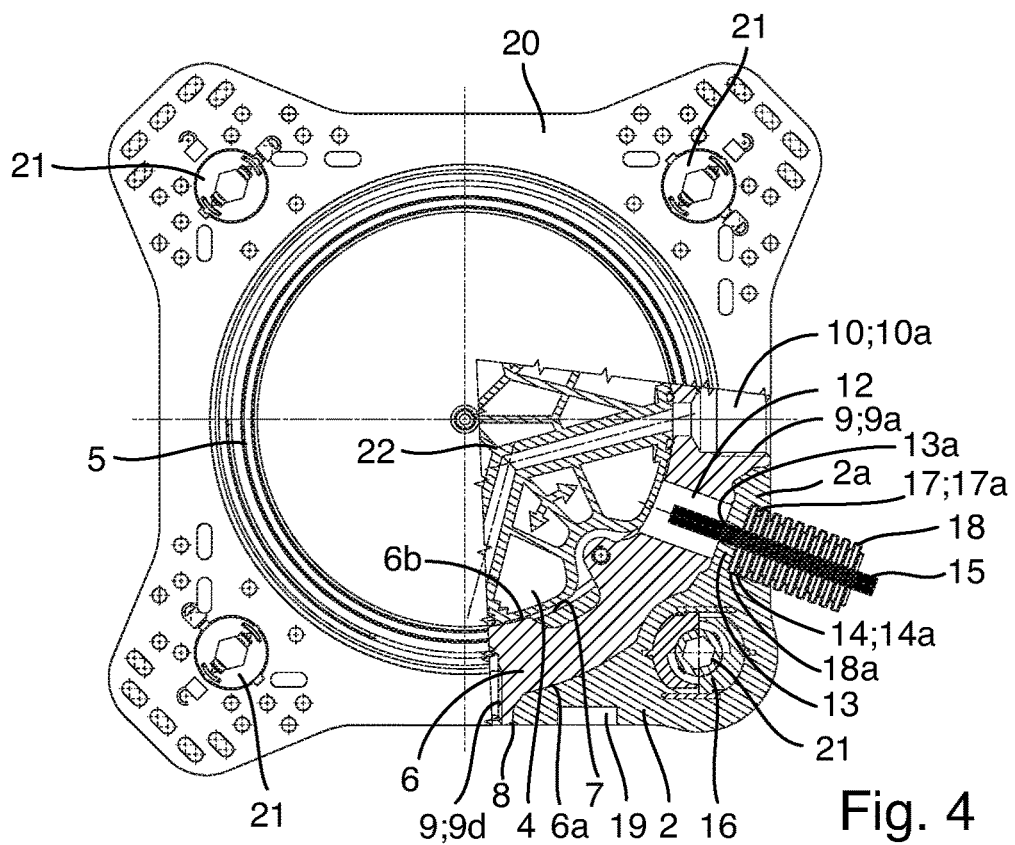
FIG. 4 shows the view of FIG. 3 with the empty tube inserted.

In correspondingly supplemented embodiments, the sanitary wall installation connection box unit, as shown in FIGS. 3 and 4, includes an electric line 15 which is fed through a membrane aperture 13a formed in the closure membrane 13, wherein the sealing resilient material of the closure membrane 13 rests sealingly on the edge of the membrane aperture 13a pressing radially inwards against the electric line 15. The feed-through of the electric line 15 through the connector body 6 can thereby be sealed fluid-tightly without requiring a separate seal. For this purpose, the closure membrane 13 is opened specifically to such an extent, i.e. is provided with the membrane aperture 13a, that the electric line 15 can be inserted through said opening, the line pushing the sealing resilient membrane material away radially outwards somewhat such that said membrane material can subsequently rest tightly against the outer circumference of the electric line 15.

FIGS. 3 and 4 show the connection box unit with a sanitary component 22 of a conventional type which is introduced into the mounting space 4 via the open front end face 5 of the sleeve portion 3 and which can be, for example, a mixing valve assembly, such as a thermostatic valve assembly, and/or a shut-off valve assembly with one or more mixing and/or shut-off valves, and which can be seen in FIGS. 3 and 4 in a cut-away region. The sanitary component 22 adjoins by a corresponding connection contour to the connection contour 7 of the connector body 6 such that inlet and outlet connections of the sanitary component 22 are in fluid connection to the fluid conduit structure 10 of the connector body 6 in a desired manner. The sanitary component 22 has one or more elements which are electrically operated and/or receive and/or output electric signals or data signals, for example a valve servomotor and/or a valve position sensor and/or a temperature sensor and/or a flow rate sensor.

In corresponding embodiments, the connector body 6, as in the example shown, has an annular shape, in alternative embodiments a cylindrical shape, or another shaping. The electric line feed-through opening 12 extends peripherally through the connector body 6 in radial direction or, as in the example shown, with a radial main direction component $H_R$, i.e. the direction component $H_R$ of a longitudinal axis $L_L$ of the line feed-through opening 12 is greater in the radial direction with respect to a center point $Z_A$ of the annular connector body 6 than a remaining direction component $M_R$ perpendicular thereto, as illustrated in FIG. 3. In the example shown, the annular shape of the connector body 6 is circular in cross section; alternatively, it can be, for example, oval or polygonal. In the example shown, the annular shape of the connector body 6 is peripherally closed; alternatively, it can be a peripherally open annular shape extending over a peripheral angle of less than 360°.

In corresponding embodiments, the fluid line connection interface structure 9 includes a plurality of fluid line connection interfaces disposed on a peripheral side of the connector body 6, and the fluid conduit structure 10 includes a plurality of associated fluid conduits between the respective fluid line connection interface and the sanitary component connection contour. In the example shown, the fluid line connection interface structure 9 includes four connection interfaces 9a, 9b, 9c, 9d, by way of example in the form of four connection ports, which are formed offset at a peripheral angular distance of 90° in each case on the outer side 6a, in the example shown specifically an outer peripheral side, of the connector body 6, and four associated fluid conduits 10a, 10b, 10c, 10d which, for example as shown, extend in the radial direction of the annular connector body 6. The electric line feed-through opening 12 is disposed peripherally, i.e. in the peripheral direction of the connector body 6, between two of the fluid conduits 10a, 10b, 10c, 10d. Specifically, the connector body 6 in the example shown includes a plurality of electric line feed-through openings 12, for example specifically four, with at least one of said openings being disposed between two of the fluid conduits, for example specifically all four alternating with the four fluid conduits 10a, 10b, 10c, 10d.

In corresponding embodiments, the base portion 2 of the box housing body 1 in the electric line connection region 2a, as in the example shown, has an outside, blind hole-shaped tube insertion port opening 14 in the sealing resilient material, wherein the tube insertion port opening 14 in longitudinal direction overlaps with the electric line feed-through opening 12 of the connector body 6, and the closure membrane 13 forms a bottom region of the tube insertion port opening 14. The tube insertion port opening 14, as in the example shown, is preferably coaxial to the electric line feed-through opening 12 of the connector body 6; alternatively, it can be arranged obliquely or parallel offset thereto.

In corresponding realizations, the coaxially arranged tube insertion port opening 14, as in the example shown, has a diameter which is larger than, or at least identically sized to, the electric line feed-through opening 12 such that the line feed-through opening 12 completely overlaps in the longitudinal direction with the tube insertion port opening 14. In alternative embodiments, the overlap can also merely be partial, with it being favorable in general if the overlap is of such a size that the electric line 15 can be guided rectilinearly without kinks in the overlapping region.

Figure 2:
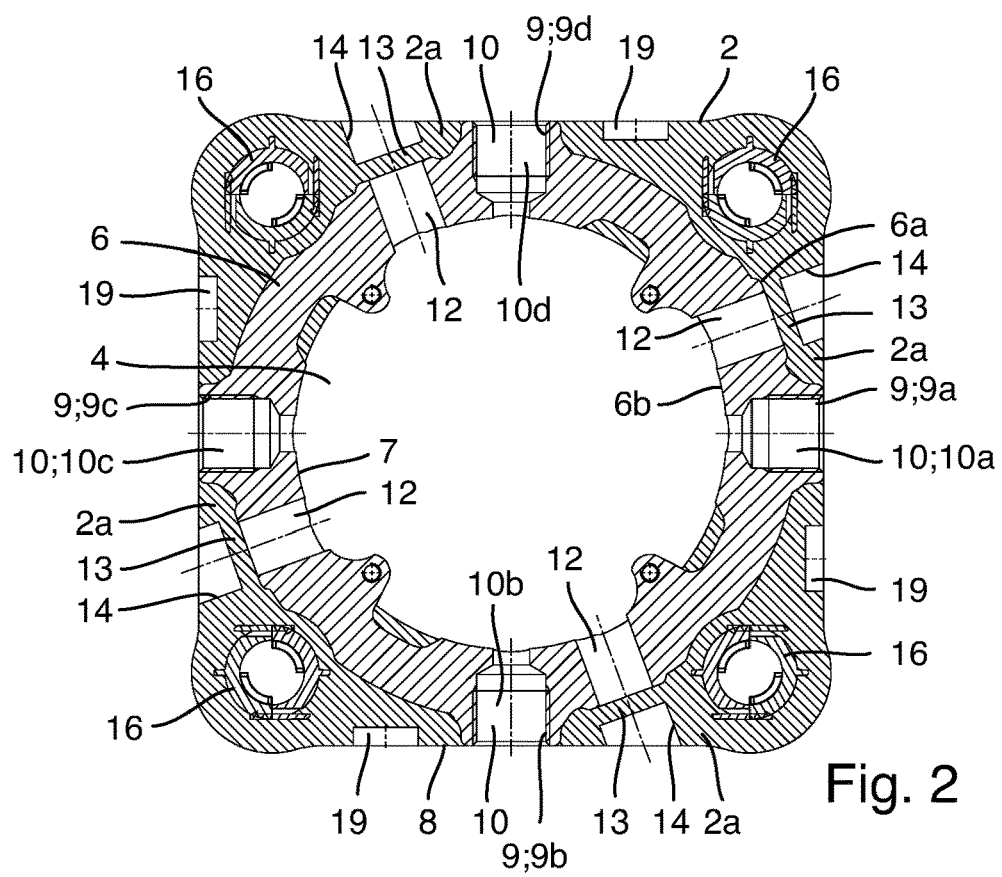
FIG. 2 shows a rearward cross-sectional view of a first variant embodiment of the connection box unit of FIG. 1 through the connector body and a base portion of the box housing body.

In advantageous embodiments, the connection box unit includes a tube retaining ridge structure 17 made of the sealing resilient material and formed on a peripheral edge 14b of the tube insertion port opening 14 to project radially inwards. FIGS. 3 and 4 show a corresponding embodiment in which the respective tube retaining ridge structure 17 includes an individual retaining ridge 17a. In alternative realizations, the tube retaining ridge structure 17 can include, for example, a plurality of tube retaining ridges spaced apart axially from one another. In the example shown, the retaining ridge 17a extends continuously on the peripheral side; in alternative realizations, the respective retaining ridge 17a can extend in a manner interrupted on the peripheral side and/or in the axial direction or in combined form in the axial direction and circumferential direction. FIG. 2 shows an embodiment without such a tube retaining ridge structure. Nevertheless, even in this case, when required, an inserted tube can be secured against unintentionally coming out, for example by the tube having a somewhat larger outer diameter than an inner diameter of the tube insertion port opening 14 such that the sealing resilient material of the edge of the tube insertion port opening 14 presses radially inwards against the outer side of the inserted tube and secures the latter by means of frictional engagement.

In advantageous embodiments, the connection box unit, as in the example shown, includes a line receiving tube 18 which is provided for receiving an electric line and is inserted with a box-side tube end 18a into the tube insertion port opening 14. Specifically, the tube here can be an empty tube which is conceived for feeding-through electric cables or other electric lines. FIG. 3 shows a situation in which the tube 18 is not yet inserted with its tube end 18a into the tube insertion port opening 14, and therefore the retaining ridge 17a can still be readily seen. FIG. 4 shows the finished mounted situation with the tube end 18a completely inserted into the tube insertion port opening 14. The tube 18 with its tube end 18a is retained by the tube retaining ridge structure 17 in the tube insertion port opening 14 in a manner secured against unintentionally coming out. For this purpose, the sealing resilient material of the tube retaining ridge structure 17 rests radially on the outside against the inserted tube end 18a and secures the latter, for example primarily by frictional engagement, against moving out axially.

In corresponding embodiments, the connector body 6 is composed of a synthetic or metallic material which has a greater stiffness as compared to the sealing resilient material of the electric line feed-through region 2a of the base portion 2, for example of a brass material or another metallic material.

In corresponding embodiments, the sealing resilient material of the electric line feed-through region 2a of the base portion 2 is a synthetic foamed material. It is preferably a thermoplastic particle foamed material which has the required sealing resilience function, such as a polypropylene foamed material.

In advantageous embodiments, the base portion 2 of the box housing body 1 in total is made of the synthetic foamed material, and the connector body 6 is embedded in the synthetic foamed material of the base portion 2, as realized in the example shown. Specifically, the connector body 6 here, in the example shown, is surrounded with touching contact both on the outer peripheral side and on the rear side and in a front-side edge region by adjacent synthetic foamed material of the base portion 2. This ensures reliable sealing between the connector body 6 and the base portion 2 or the box housing body 1 in this region. In the exploded view of FIG. 1, the connector body 6 is shown removed from its embedding in the box housing body 1 so that its contour can be seen more clearly.

In addition, the production of the base portion 2 or of the box housing body 1 from the synthetic foamed material or in general from the sealing resilient material can be used, as shown, to form one or more level-receiving openings 19 in the form of a respective blind hole in said material on the outer periphery of the base portion 2, into which openings a customary circular level or the like can be inserted as an alignment aid for the installation of the connection box unit.

In corresponding embodiments, at least one connection structure element 16 is embedded into the synthetic foamed material of the base portion 2 of the box housing body 1, as in the example shown. The connection structure element 16 has a connection structure which cooperates with a connection body 21 with which a functional surface body 20 can be held on the base portion 2, said functional surface body providing a functional surface radially outside the sleeve portion 3. This functional surface can be used in particular as a fastening and/or sealing surface in order to fasten the box housing body 1 to a wall surface of the building and/or to seal same in relation to a wall surface of the building.

In the exemplary embodiment shown, specifically four such connection structure elements 16 are embedded into the synthetic foamed material of the base portion 2, for example, as shown offset in each case by 90° in relation to one another in the peripheral angular direction in corner regions of the base portion 2 which is square in this example. Each of said connection structure elements 16 is in the form of a sleeve element with a bolt receiving opening and extends continuously through the base portion 2 between a front side and a rear side of the base portion 2. In a suitable manner with respect thereto, the respective connection body 21 can be realized as a connection bolt which can be inserted into the bolt receiving opening and can be fastened, preferably releasably, therein. In alternative embodiments, only one, two, three or more than four such connection structure elements 16 are embedded into the synthetic foamed material of the base portion 2, and/or one or more such connection structure elements 16 are arranged in a different distribution or in other regions of the base portion 2, or the connection box unit is formed without such connection structure elements.

As the exemplary embodiments which are shown and which are explained further above make clear, the invention provides a wall installation connection box unit which affords advantages in particular in respect of supplying electric lines from outside the connection box unit into the interior of the box housing body and especially into the region of the sanitary component mounting space or to an electrical function component arranged there.

Although the invention has been described in detailed with reference to preferred embodiments, variations and modifications exist within the spirit and scope of the invention as described and defined in the following claims.

The invention claimed is:

1. A sanitary wall installation connection box unit, comprising:
   a box housing body having a rear-side base portion and a sleeve portion projecting forward from the base portion, which sleeve portion peripherally surrounds a sanitary component mounting space, which sanitary component mounting space is accessible via an open front end face of the sleeve portion; and a connector body disposed on the base portion of the box housing body, which connector body comprises a sanitary component connection contour facing the sanitary component mounting space, a fluid line connection interface structure accessible on an outer side of the box housing body, a fluid conduit structure for fluid connection of the fluid line connection interface structure to the sanitary component connection contour, and at least one electric line feed-through opening leading from an outer side of the connector body through the connector body to the sanitary component mounting space;

wherein:

the base portion of the box housing body is made of a sealing resilient material at least in an electric line connection region adjacent to the electric line feed-through opening of the connector body;

the electric line feed-through opening of the connector body is covered on an outer side by a closure membrane made of the sealing resilient material of the electric line feed-through region of the base portion; and the base portion of the box housing body in the electric line connection region has an outside, blind hole-shaped tube insertion port opening in the sealing resilient material, wherein the tube insertion port opening in a longitudinal direction overlaps with the electric line feed-through opening of the connector body, and wherein the closure membrane forms a bottom region of the tube insertion port opening.

2. The sanitary wall installation connection box unit according to claim 1, further comprising an electric line which is fed through a membrane aperture formed in the closure membrane, wherein the sealing resilient material of the closure membrane rests sealingly on an edge of the membrane aperture pressing radially inwards against the electric line.

3. The sanitary wall installation connection box unit according to claim 1, wherein the connector body has an annular or cylindrical shape and the electric line feed-through opening extends peripherally through the connector body in a radial direction or with a radial main direction component.

4. The sanitary wall installation connection box unit according to claim 1, wherein:

the fluid line connection interface structure comprises a plurality of fluid line connection interfaces disposed on a peripheral side on the connector body, and the fluid conduit structure comprises a plurality of associated fluid conduits between the respective fluid line connection interface and the sanitary component connection contour; and the electric line feed-through opening is disposed peripherally between two of the fluid conduits, or the connector body includes a plurality of electric line feed-through openings, with at least one of said openings being disposed between two of the fluid conduits.

5. The sanitary wall installation connection box unit according to claim 1, further comprising a line receiving tube which is provided for receiving an electric line and is inserted with a box-side tube end into the tube insertion port opening of the base portion of the box housing body.

6. The sanitary wall installation connection box unit according to claim 1, wherein the connector body is composed of a synthetic or metallic material which has a greater stiffness as compared to the sealing resilient material of the electric line feed-through region of the base portion.

7. The sanitary wall installation connection box unit according to claim 1, wherein the sealing resilient material of the electric line feed-through region of the base portion is a synthetic foamed material.

8. The sanitary wall installation connection box unit according to claim 7, wherein the sealing resilient material of the electric line feed-through region of the base portion is a thermoplastic particle foamed material.

9. The sanitary wall installation connection box unit according to claim 1, wherein the base portion in total is made of the synthetic foamed material, and the connector body is embedded in the synthetic foamed material of the base portion.

10. The sanitary wall installation connection box unit according to claim 1, wherein the tube insertion port opening is coaxial to the electric line feed-through opening of the connector body.

11. The sanitary wall installation connection box unit according to claim 1, further comprising a tube retaining ridge structure made of the sealing resilient material and formed on a peripheral edge of the tube insertion port opening to project radially inwards.

12. A sanitary wall installation connection box unit, comprising:

a box housing body having a rear-side base portion and a sleeve portion projecting forward from the base portion, which sleeve portion peripherally surrounds a sanitary component mounting space, which sanitary component mounting space is accessible via an open front end face of the sleeve portion; and a connector body disposed on the base portion of the box housing body, which connector body comprises a sanitary component connection contour facing the sanitary component mounting space, a fluid line connection interface structure accessible on an outer side of the box housing body, a fluid conduit structure for fluid connection of the fluid line connection interface structure to the sanitary component connection contour, and at least one electric line feed-through opening leading from an outer side of the connector body through the connector body to the sanitary component mounting space;

wherein:

the base portion of the box housing body is made of a sealing resilient material at least in an electric line connection region adjacent to the electric line feed-through opening of the connector body, and the electric line feed-through opening of the connector body is covered on an outer side by a closure membrane made of the sealing resilient material of the electric line feed-through region of the base portion;

wherein the connector body has an annular or cylindrical shape and the electric line feed-through opening extends peripherally through the connector body in a radial direction or with a radial main direction component;

the fluid line connection interface structure comprises a plurality of fluid line connection interfaces disposed on a peripheral side on the connector body, and the fluid conduit structure comprises a plurality of associated fluid conduits between the respective fluid line connection interface and the sanitary component connection contour;

the electric line feed-through opening is disposed peripherally between two of the fluid conduits, or the connector body includes a plurality of electric line feed-through openings, with at least one of said openings being disposed between two of the fluid conduits; and wherein the base portion of the box housing body in the electric line connection region has an outside, blind hole-shaped tube insertion port opening in the sealing resilient material, wherein the tube insertion port opening in a longitudinal direction overlaps with the electric line feed-through opening of the connector body, and wherein the closure membrane forms a bottom region of the tube insertion port opening.

13. The sanitary wall installation connection box unit according to claim 12, wherein the tube insertion port opening is coaxial to the electric line feed-through opening of the connector body.

14. The sanitary wall installation connection box unit according to claim 12, further comprising a tube retaining ridge structure made of the sealing resilient material and formed on a peripheral edge of the tube insertion port opening to project radially inwards.

* * * * *